(12) United States Patent
Saylor et al.

(10) Patent No.: US 12,269,310 B2
(45) Date of Patent: Apr. 8, 2025

(54) VARIABLE SUSPENSION SPRING RATES USING MAGNETORHEOLOGICAL FLUID

(71) Applicant: GM GLOBAL TECHNOLOGY OPERATIONS LLC, Detroit, MI (US)

(72) Inventors: Brian K. Saylor, South Lyon, MI (US); Robert Patrick Marble, White Lake, MI (US); Christopher J. Mettrick, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 18/312,823

(22) Filed: May 5, 2023

(65) Prior Publication Data

US 2024/0367473 A1 Nov. 7, 2024

(51) Int. Cl.
*B60G 17/02* (2006.01)
*B60G 11/58* (2006.01)
*B60G 17/0165* (2006.01)

(52) U.S. Cl.
CPC ............ *B60G 17/021* (2013.01); *B60G 11/58* (2013.01); *B60G 17/0165* (2013.01);
(Continued)

(58) Field of Classification Search
CPC .... B60G 11/58; B60G 15/063; B60G 15/065; B60G 17/0165; B60G 17/0272;
(Continued)

(56) References Cited

U.S. PATENT DOCUMENTS 3,911,829 A * 10/1975 Ross .................... F16F 6/00
                                                                105/157.1
5,263,695 A * 11/1993 Bianchi ................ B60G 11/14
                                                                267/225
(Continued)

FOREIGN PATENT DOCUMENTS

| CN | 1587738 A | * | 3/2005 | ............. F16F 9/535 |
| CN | 1946578 A | * | 4/2007 | ........... B60G 15/065 |

(Continued)

OTHER PUBLICATIONS

Office Action dated Apr. 4, 2024 from German Patent Office for German Patent No. 102023126183.5; 5pgs.

*Primary Examiner* — Drew J Brown (57) ABSTRACT

A vehicle suspension control system includes a central suspension spring core, a first suspension spring surrounding an upper portion of the central suspension spring core, a second suspension spring surrounding a lower portion of the central suspension spring core, the first suspension spring and the second suspension spring coupled between a wheel and a fixed structure of a vehicle to inhibit movement of the wheel, a spring seat surrounding the central suspension spring core and coupled between the first and second suspension springs, the spring seat including an outer sleeve and multiple seals for retaining magnetorheological fluid between the outer sleeve and the central suspension spring core, one or more electromagnets adjacent the spring seat, and a suspension control module configured to energize the one or more electromagnets to selectively modify a viscosity of the magnetorheological fluid to inhibit movement of the first suspension spring or the second suspension spring.

19 Claims, 8 Drawing Sheets

(52) U.S. Cl.
CPC ...... *B60G 2204/62* (2013.01); *B60G 2206/42* (2013.01); *B60G 2400/821* (2013.01); *B60G 2500/22* (2013.01); *B60G 2600/182* (2013.01); *B60G 2600/20* (2013.01); *B60G 2600/26* (2013.01); *B60G 2800/162* (2013.01); *B60G 2800/916* (2013.01)

(58) Field of Classification Search
CPC ........ B60G 17/033; B60G 2204/12422; B60G 2204/62; B60G 2400/82; B60G 2500/22; B60G 2600/26; B60G 2800/91; B60G 2800/916; F16F 1/065; F16F 1/12; F16F 1/121; F16F 1/361; F16F 6/00; F16F 9/36; F16F 9/50; F16F 9/53; F16F 9/535; F16F 15/03; F16F 15/18
See application file for complete search history.

(56) References Cited

U.S. PATENT DOCUMENTS

| | | | | |
|---|---|---|---|---|
| 6,000,703 | A * | 12/1999 | Schubert | B60G 17/0165 280/5.518 |
| 6,830,256 | B2 * | 12/2004 | Bryant | B60G 15/06 267/225 |
| 7,237,780 | B2 * | 7/2007 | Ohki | B60G 17/021 280/124.165 |
| 7,874,561 | B2 * | 1/2011 | Michel | B60G 17/021 280/6.157 |
| 7,926,822 | B2 * | 4/2011 | Ohletz | B60G 11/16 280/124.179 |
| 8,313,108 | B2 * | 11/2012 | Ac | B60G 17/025 280/5.511 |
| 8,573,573 | B2 * | 11/2013 | Michel | B60G 15/068 267/225 |
| 8,844,943 | B2 * | 9/2014 | Kim | B60G 99/002 280/5.514 |
| 9,162,548 | B1 * | 10/2015 | Wakeman | F16F 1/121 |
| 10,336,151 | B2 * | 7/2019 | Cox | B60G 15/065 |
| 10,343,741 | B2 * | 7/2019 | Walthert | B62K 25/08 |
| 10,953,717 | B2 * | 3/2021 | Ricketts | B60G 15/065 |
| 2002/0038929 | A1 * | 4/2002 | Now | B60G 17/021 267/217 |
| 2004/0232648 | A1 * | 11/2004 | Ohki | B60G 15/02 280/124.164 |
| 2005/0253350 | A1 * | 11/2005 | Suchta | B60G 21/106 280/124.106 |
| 2008/0290624 | A1 * | 11/2008 | Yamanaka | B60G 17/0272 280/124.154 |
| 2009/0095584 | A1 * | 4/2009 | Kondo | F16F 9/18 188/267 |
| 2009/0108546 | A1 * | 4/2009 | Ohletz | B60G 15/063 280/124.179 |
| 2011/0022265 | A1 * | 1/2011 | Sekiya | B60G 17/08 701/37 |
| 2012/0160621 | A1 * | 6/2012 | Battlogg | B60G 17/08 188/267.2 |
| 2013/0200589 | A1 * | 8/2013 | Cox | B60G 17/0272 267/218 |
| 2013/0341843 | A1 * | 12/2013 | Battlogg | F16F 9/532 188/267.2 |
| 2014/0015180 | A1 * | 1/2014 | Pepka | B60G 13/02 267/195 |
| 2014/0265080 | A1 * | 9/2014 | Cox | B60G 17/0272 267/218 |
| 2015/0175236 | A1 * | 6/2015 | Walthert | B60G 17/08 280/5.515 |
| 2018/0037078 | A1 * | 2/2018 | Shinozaki | B60G 11/16 |
| 2018/0297434 | A1 * | 10/2018 | Ohno | B60G 17/02 |
| 2018/0361816 | A1 * | 12/2018 | Ohno | B60G 17/0165 |
| 2019/0366791 | A1 * | 12/2019 | Toyohira | B60G 17/06 |
| 2020/0001677 | A1 * | 1/2020 | Blankson | B60G 15/065 |
| 2020/0023704 | A1 * | 1/2020 | Toyohira | B60G 17/0165 |
| 2020/0400206 | A1 * | 12/2020 | Zohar | F16F 1/13 |
| 2021/0276385 | A1 * | 9/2021 | Smith | B60G 15/065 |
| 2022/0016950 | A1 * | 1/2022 | Ericksen | B60G 17/01908 |
| 2022/0063364 | A1 * | 3/2022 | Tao | B60G 17/0155 |
| 2023/0286346 | A1 * | 9/2023 | Yamazaki | B60G 17/06 |
| 2023/0302862 | A1 * | 9/2023 | Adamovsky | B60G 17/021 |

FOREIGN PATENT DOCUMENTS

| | | | | |
|---|---|---|---|---|
| CN | 105422707 | A * | 3/2016 | |
| CN | 108253079 | A * | 7/2018 | |
| CN | 111734773 | A * | 10/2020 | |
| DE | 10045954 | A1 * | 3/2002 | F16F 15/03 |
| DE | 102015108179 | A1 | 1/2016 | |
| DE | 102015016024 | A1 * | 6/2016 | B60G 11/16 |
| DE | 102015224527 | A1 * | 6/2017 | B60G 15/065 |
| DE | 102018130418 | A1 * | 3/2020 | B60G 11/14 |
| EP | 2009322 | A2 * | 12/2008 | B60G 15/063 |
| EP | 3939813 | A1 * | 1/2022 | B60G 17/0165 |
| JP | H1122775 | A * | 1/1999 | |
| JP | 2001206035 | A * | 7/2001 | B60G 17/027 |
| JP | 2004314840 | A * | 11/2004 | B60G 11/58 |
| KR | 101130785 | B1 * | 3/2012 | |
| WO | WO-2014065310 | A1 * | 5/2014 | B60G 15/063 |
| WO | WO-2023188695 | A1 * | 10/2023 | |

* cited by examiner

VARIABLE SUSPENSION SPRING RATES USING MAGNETORHEOLOGICAL FLUID

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to variable suspension spring rates using magnetorheological fluid and energized electromagnets.

Vehicles may have multi-rate suspensions, which allow for variation in the spring rate for different driving conditions. A multi-rate suspension provides a balance between vehicle performance and ride comfort while driving, by allowing for finer tuning of both performance and comfort. However, options for switching between spring rates are often complex or impractical.

SUMMARY

A vehicle suspension control system includes a central suspension spring core, a first suspension spring surrounding an upper portion of the central suspension spring core, a second suspension spring surrounding a lower portion of the central suspension spring core, the first suspension spring and the second suspension spring coupled between a wheel and a fixed structure of a vehicle to inhibit movement of the wheel, a spring seat surrounding the central suspension spring core and coupled between the first suspension spring and the second suspension spring, the spring seat including an outer sleeve and multiple seals for retaining magnetorheological fluid between the outer sleeve and the central suspension spring core, one or more electromagnets adjacent the spring seat, and a suspension control module configured to energize the one or more electromagnets to selectively modify a viscosity of the magnetorheological fluid to inhibit movement of at least one of the first suspension spring and the second suspension spring.

In other features, the suspension control module is configured to reduce energization of the one or more electromagnets to selectively allow movement of both the first suspension spring and the second suspension spring.

In other features, the suspension control module is configured to selectively energize the one or more electromagnets to transition between a first state in which the one or more electromagnets are energized at a specified first energization value to lock the spring seat to the central suspension spring core and inhibit movement of the second suspension spring, and a second state in which the one or more electromagnets are energized at a specified second energization value to allow the spring seat to move relative to the central suspension spring core and allow movement of the second suspension spring, wherein the specified second energization value is less than the specified first energization value.

In other features, the specified second energization value is zero. In other features, the suspension control module is configured to transition from the second state to the first state to facilitate the magnetorheological fluid locking the spring seat to the central suspension spring core in less than or equal to twenty milliseconds.

In other features, the suspension control module is configured to selectively energize the one or more electromagnets at a specified third energization value to partially inhibit movement of the spring seat relative to the central suspension spring core, and the specified third energization value is greater than the specified second energization value and less than the specified first energization value.

In other features, the one or more electromagnets include at least one coaxial magnet configured to extend in a circumference around the central suspension spring core. In other features, the one or more electromagnets include at least one field magnet configured to extend parallel to a longitudinal direction of the central suspension spring core.

In other features, the suspension control module is configured to change a level of energy supplied to the one or more electromagnets over a specified period of time, according to a specified transient spring rate restriction profile. In other features, the specified transient spring rate restriction profile includes an increasing rate of energization during a first time period, followed by a decreasing rate of energization during a second time period subsequent to the first time period, to capture a displacement of the wheel beyond a threshold displacement value.

In other features, the first suspension spring and the second suspension spring are coupled in series between the wheel and the fixed structure of the vehicle. In other features, the first suspension spring and the second suspension spring are coupled in parallel between the wheel and the fixed structure of the vehicle.

In other features, the system includes the fixed structure includes a chassis of the vehicle. In other features, the at least one vehicle sensor configured to detect terrain data in front of the vehicle, wherein the suspension control module is configured to adjust a level of energization applied to the one or more electromagnets according to the terrain data detected by the at least one vehicle sensor.

In other features, the suspension control module is configured to adjust a level of energization applied to the one or more electromagnets according to a driving stiffness setting input received via a user interface.

A method of controlling a vehicle suspension includes energizing, via a suspension control module, one or more electromagnets adjacent a spring seat surrounding a central suspension spring core, the spring seat coupled between a first suspension spring and a second suspension spring each surrounding the central suspension spring core, the spring seat including an outer sleeve and multiple seals for retaining magnetorheological fluid between the outer sleeve and the central suspension spring core, wherein energizing the one or more electromagnets modifies a viscosity of the magnetorheological fluid to inhibit movement of at least one of the first suspension spring and the second suspension spring, and reducing energization, by the suspension control module, of the one or more electromagnets to selectively allow movement of both the first suspension spring and the second suspension spring.

In other features, the method includes selectively energizing the one or more electromagnets at a specified first energization value to lock the spring seat to the central suspension spring core and inhibit movement of the second suspension spring, and selectively energizing the one or more electromagnets at a specified second energization value to allow the spring seat to move relative to the central suspension spring core and allow movement of the second suspension spring, wherein the specified second energization value is less than the specified first energization value.

In other features, the method includes selectively energizing the one or more electromagnets at a specified third energization value to partially inhibit movement of the spring seat relative to the central suspension spring core, wherein the specified third energization value is greater than the specified second energization value and less than the specified first energization value.

In other features, the method includes changing a level of energy supplied to the one or more electromagnets over a specified period of time, according to a specified transient spring rate restriction profile.

In other features, the specified transient spring rate restriction profile includes an increasing rate of energization during a first time period, followed by a decreasing rate of energization during a second time period subsequent to the first time period, to capture a displacement of a wheel beyond a threshold displacement value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some example embodiments described herein include a multi-rate suspension that uses a suspension spring sleeve that incorporates magnetorheological (MR) fluid to provide a balance between a fluid oil and a viscoelastic solid, to isolate or lock one of multiple springs from being utilized. Modifying the viscosity of the MR fluid using electromagnet(s) allows for control over transitions between different spring rates based on, for example, a degree of locking of the suspension spring sleeve to a central suspension spring core.

A vehicle suspension control module may control of for the magnetorheological fluid from a low viscosity fluid to a viscoelastic solid (and vice-versa) to generate a desired amount of friction or locking for a spring seat isolator. For example, in a multi-rate suspension having two springs with spring rates K1 and K2, the use of MR fluid allows for a transition from an overall spring rate of K1+K2 combined (e.g., $1/K_T=1/K_1+1/K_2$ in a series spring coupling), to K1 alone (e.g., when K2 is isolated by locking the spring seat isolator using the MR fluid).

The vehicle suspension control module may control transitions of the MR fluid between different viscosity states using various control algorithms and parameters, such as binary transitions, haversine transitions, sine transitions, ramp transitions, etc.

The MR fluid sleeve may be mounted to an intermediate spring seat between two (or more) springs in series. The sleeve may then lock movement of one spring, such that only the other spring is allowed to move, by energizing a magnetic field around the MR fluid sleeve (e.g., via one or more electromagnets). Changing between different spring K rates on a suspension corner may be used to control transient wheel hop conditions.

Figure 1:
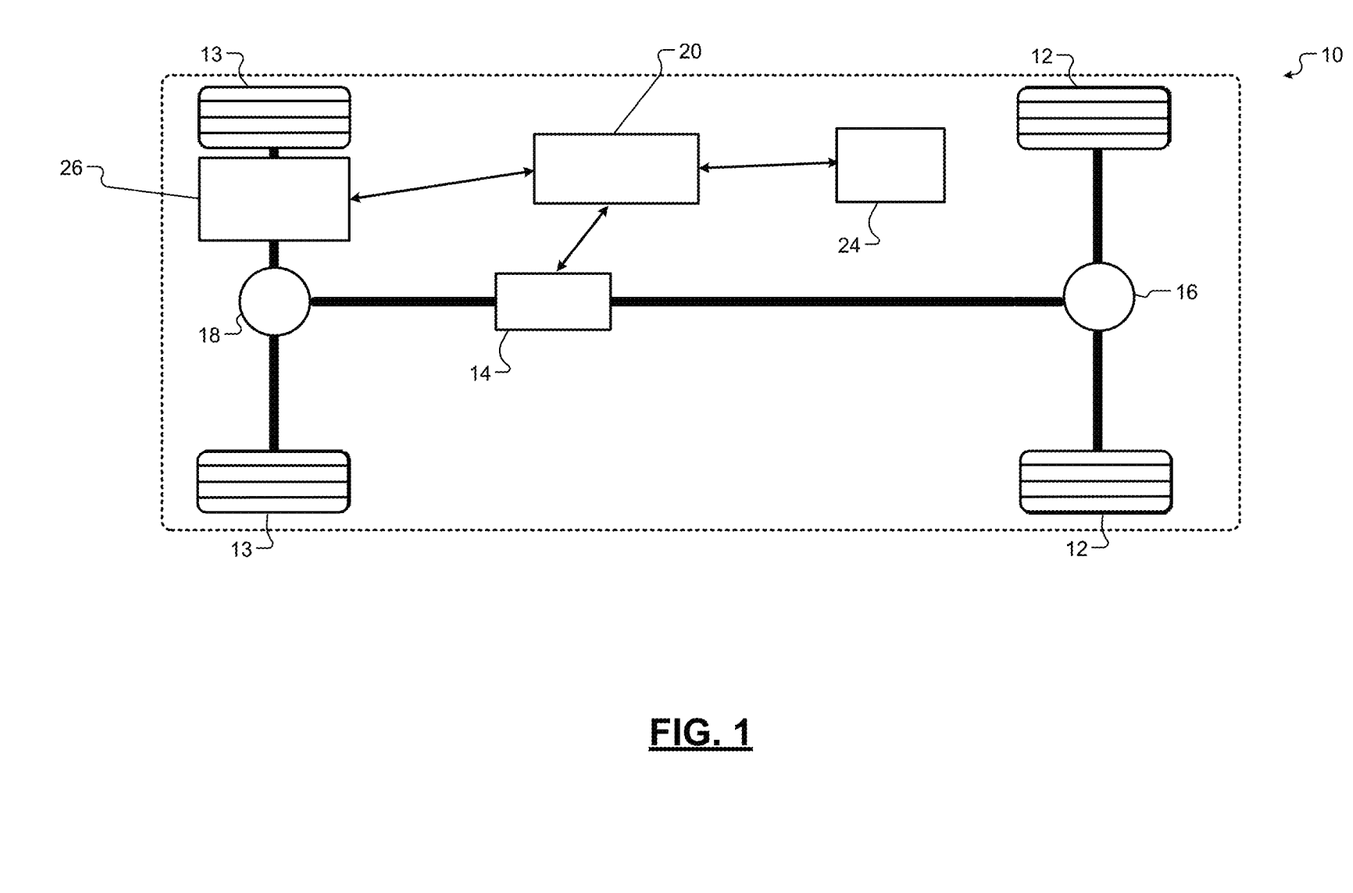
FIG. 1 is a functional block diagram of an example embodiment of a vehicle including a suspension control module.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors 24 (such as cameras, microphones, pressure sensors, wheel position sensors, light detection and ranging (Lidar) sensors, suspension position sensors, etc.). The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle to vehicle (V2V) communication, vehicle to load (V2L) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks.

As shown in FIG. 1, the vehicle control module 20 may control one or more suspension control modules 26. For example, one or more of the wheels 12 and 13 may include a multi-rate suspension, such as the example multi-rate suspensions illustrated in FIGS. 2-6 and described further below.

A suspension control module 26 may be configured to control a spring rate of each multi-rate suspension, such as by selectively energizing electromagnet(s) at each multi-rate suspension to control viscosity of magnetorheological fluid, in order to modify an amount of stiffness (e.g., by controlling a degree of locking of a spring via a spring seat in contact with the MR fluid).

Although FIG. 1 illustrates the suspension control module 26 at the wheel 13 and in communication with the vehicle control module, in various example embodiments the suspension control module 26 may be part of the vehicle control module 20, the vehicle control module 20 may implement suspension spring rate functionality, etc.

Figure 2:
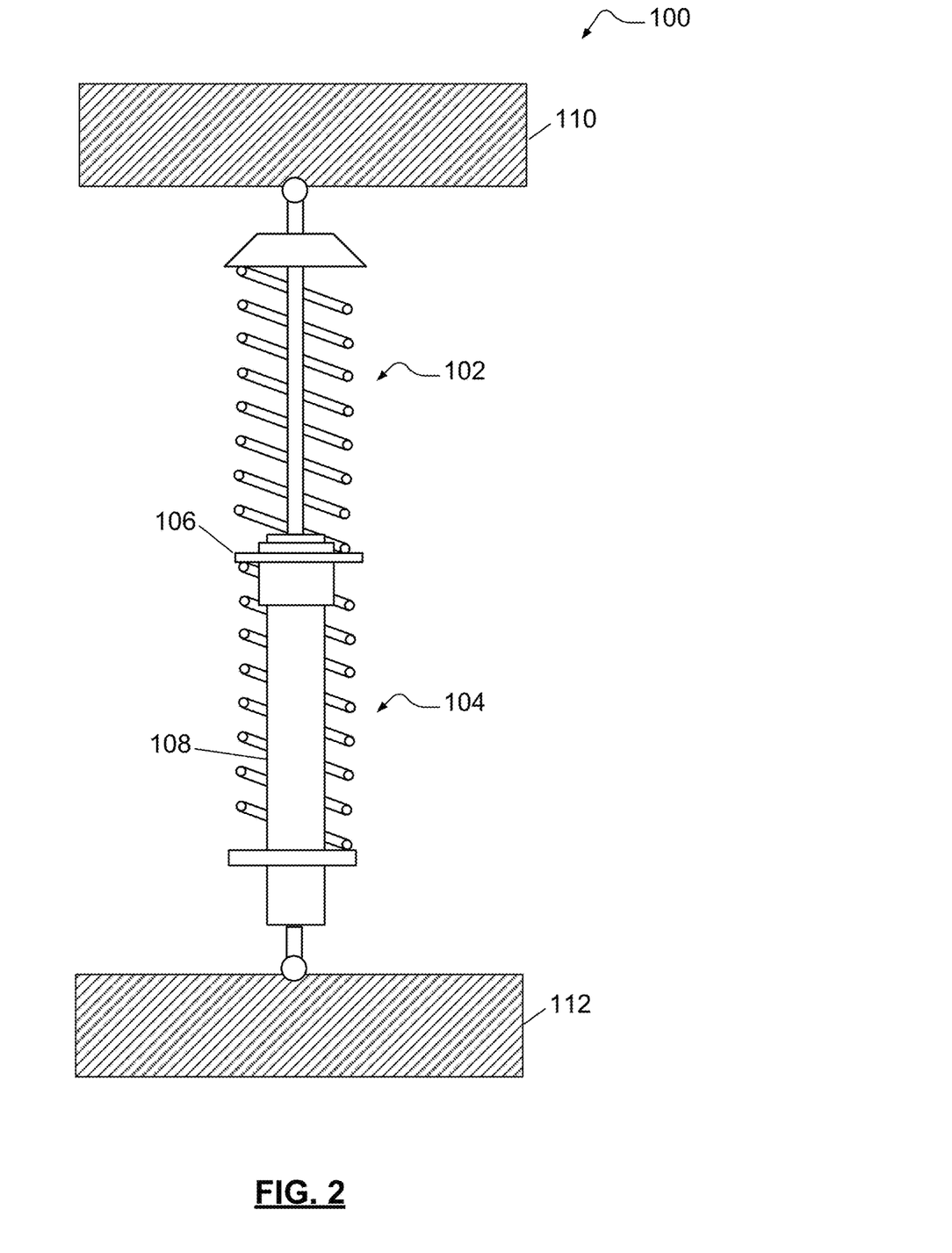
FIG. 2 is a front sectional view of an example embodiment of a multi-rate vehicle suspension including multiple springs.

FIG. 2 is a front sectional view of an example embodiment of a multi-rate vehicle suspension 100 including multiple springs. As shown in FIG. 1, the multi-rate vehicle suspension 100 includes a first suspension spring 102 surrounding an upper portion of a central suspension spring core 108, and a second suspension spring 104 surrounding a lower portion of the central suspension spring core 108.

The first suspension spring 102 and the second suspension spring 104 may have different spring rates. For example, the first suspension spring 102 may have a spring rate K1 that is different than a spring rate K2 of the second suspension spring 104. When the first suspension spring 102 and the second suspension spring 104 are coupled in series between the unsprung mass 112 and the sprung mass 110, a combined spring rate may be equal to $1/K_T=1/K_1+1/K_2$. In other example embodiments, the first suspension spring 102 and the second suspension spring 104 may be coupled in parallel between the unsprung mass 112 and the sprung mass 110.

The unsprung mass 112 may include, for example, a wheel of a vehicle (such as the wheel 13 of the vehicle 10 in FIG. 1), an axle on which a wheel is mounted, etc. The sprung mass 110 may include, for example, a fixed structure of the vehicle, such as a frame of the vehicle, a chassis of the vehicle, a body of the vehicle, etc.

The first suspension spring 102 and the second suspension spring 104 may be any suitable suspension springs, such as coil springs designed to support the weight of a vehicle. A default spring rate of each suspensions spring may be designed to inhibit movement of the wheel during driving conditions, to dampen vibrations as the wheel moves over uneven terrain, etc.

As shown in FIG. 2, a spring seat 106 surrounds the central suspension spring core 108. The spring seat 106 is coupled between the first suspension spring 102 and the second suspension spring 104. The spring seat 106 includes a planar surface (e.g., a disk or ring shaped extension), which provides a seat between the first suspension spring 102 and the second suspension spring 104, to allow the first suspension spring 102 and the second suspension spring 104 to move together to provide a combined spring rate between the unsprung mass 112 and the sprung mass 110.

As described further below, the spring seat 106 may be locked to the central suspension spring core 108, to inhibit movement of the second suspension spring 104. For example, MR fluid may be configured to lock the spring seat 106 to the central suspension spring core 108 via increased viscosity of the MR fluid when an electromagnetic field is applied to the MR fluid.

Locking the spring seat 106 may lock movement of the second suspension spring 104, changing an overall spring rate of the multi-rate suspension 100 to be equal to only the spring rate K1 of the first suspension spring 102. This may increase stiffness of the multi-rate suspension 100, by removing the spring rate K2 of the second suspension spring 104.

In various example embodiments, the degree of locking of the spring seat 106 to the central suspension spring core 108 may be controlled by selectively applying varying electromagnetic fields to the MR fluid via electromagnets, which may increase the friction generated by the MR fluid on the spring seat 106. The spring seat 106, and the central suspension spring core 108, may have cylindrical shapes, where an inner diameter of the spring seat 106 is larger than an outer diameter of the central suspension spring core 108, allowing the spring seat 106 to move up and down relative to the central suspension spring core 108 when the MR fluid is not activated by the electromagnetic field.

Figure 3:
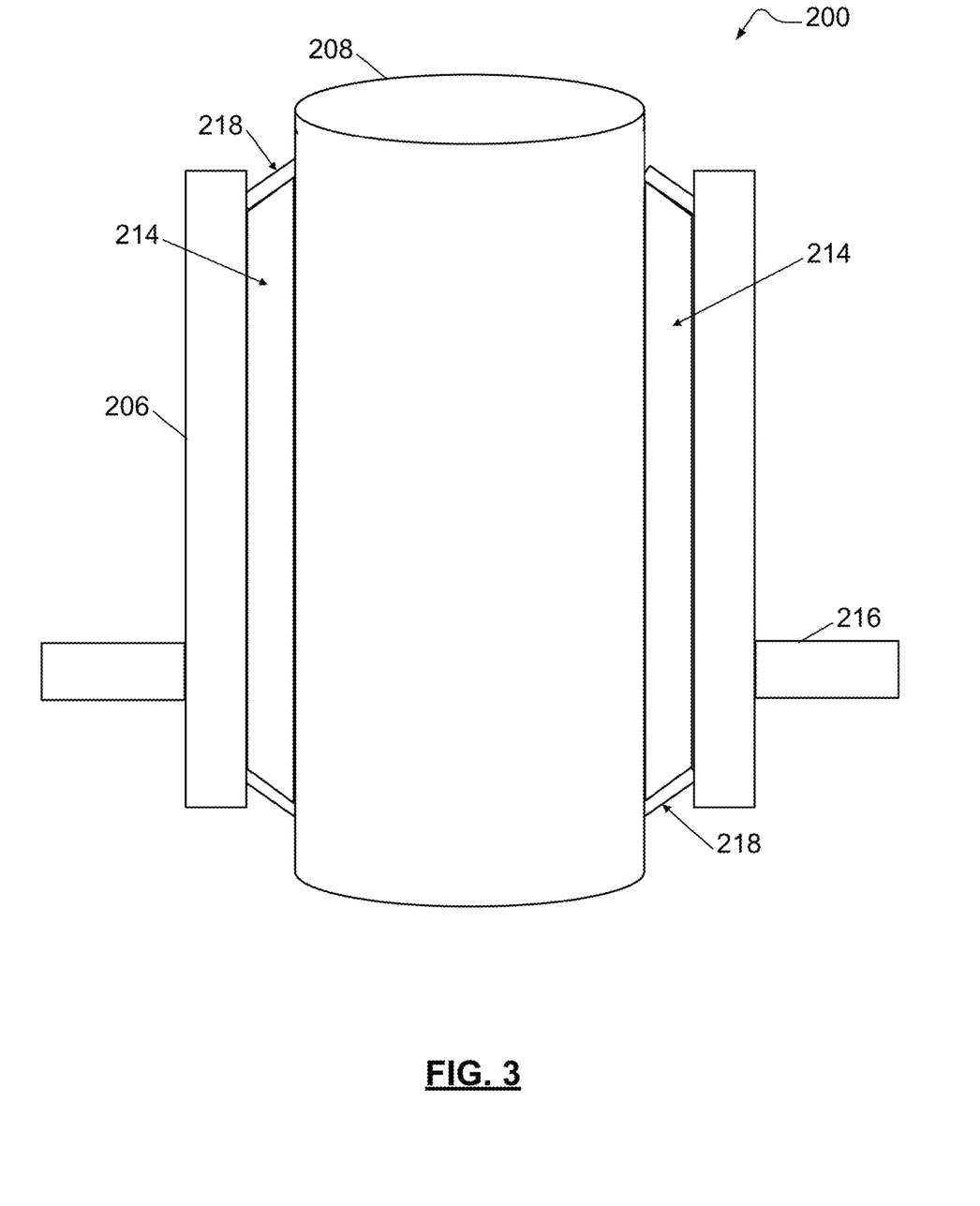
FIG. 3 is a front sectional view of an example embodiment of a spring seat sleeve including seals for retaining a magnetorheological fluid.

FIG. 3 is a front sectional view of an example embodiment of a spring seat sleeve 200 including seals 218 for retaining a magnetorheological fluid 214. As shown in FIG. 3, the MR fluid 214 may be retained between an outer surface of the central suspension spring core 208, and an inner surface of the outer sleeve 206 of the spring seat sleeve 200.

In the example embodiment, applying an electromagnetic field to the MR fluid 214 (e.g., via energizing one or more electromagnets adjacent the spring seat sleeve 200), changes a viscosity of the MR fluid 214. This change in viscosity of the MR fluid 214 inhibits movement of the spring seat sleeve 200 relative to the central suspension spring core 208.

For example, when the electromagnetic field is fully applied (e.g., the electromagnets are fully energized), the MR fluid 214 may generate sufficient friction between the central suspension spring core 208 and the spring seat sleeve 200 to lock the spring seat sleeve 200 in place along the central suspension spring core 208. As the electromagnetic field is reduced (e.g., by reducing power to the electromagnets), the MR fluid 214 viscosity may change to allow inhibited movement of the spring seat sleeve 200 along the central suspension spring core 208.

When the electromagnetic field is reduced further (or turned off), the spring seat sleeve 200 may be allowed to move freely relative to the central suspension spring core 208. Therefore, controlling the electromagnetic field applied to the MR fluid 214 may allow for controlling a degree of locking of the spring seat sleeve 200 to the central suspension spring core.

The spring seat sleeve 200 includes an intermediate spring isolator 216. The intermediate spring isolator 216 may extend around an outer surface of the outer sleeve 206 in a circular arrangement, may extend outwards on one or more sides of the outer sleeve 206, etc. The intermediate spring isolator 216 may provide a surface for contacting the first suspension spring 102 and/or the second suspension spring 104, to provide a coupling between the suspension springs. In some example embodiments, the intermediate spring isolator 216 may be collapsible or expandable as desired to set a desired trim height, such as via hydraulics, a ball screw drive, etc. In various example embodiments, a tube in tube MR unit may be used to fit over a damper, for ease of manufacturing.

As described above, the suspension control module 26 may be configured to energize the one or more electromagnets to selectively modify a viscosity of the magnetorheological fluid 214, to inhibit movement of at least one of the first suspension spring 102 and the second suspension spring 104. Similarly, the suspension control module 26 may be configured to reduce energization of the one or more electromagnets to selectively allow movement of both the first suspension spring 102 and the second suspension spring 104.

The suspension control module 26 may selectively energize the electromagnets at various levels, to provide a range of spring rate variation at different states. For example, the suspension control module 26 may be configured to selectively energize the one or more electromagnets to transition between a first state in which the one or more electromagnets are energized at a specified first energization value to lock the spring seat sleeve 200 to the central suspension spring core 208 and inhibit movement of the second suspension spring 104, and a second state in which the one or more electromagnets are energized at a specified second energization value to allow the spring seat sleeve 200 to move relative to the central suspension spring core 208 and allow movement of the second suspension spring 104.

The specified second energization value may be less than the specified first energization value. In some example embodiments, the specified second energization value is zero. The MR fluid 214 may provide very fast viscosity changes in response to changes in electromagnetic fields. For example, the suspension control module 26 may be configured to transition from the second state to the first state to facilitate the magnetorheological fluid 214 locking the spring seat sleeve 200 to the central suspension spring core 208 in less than or equal to twenty milliseconds.

The suspension control module 26 may be configured to provide binary transitions between locked and freely moving states, as described above. In other example embodiments, the suspension control module 26 may be configured to transition the MR fluid 214 to intermediate state(s) between a fully locked state or a free movement state. For example, the suspension control module 26 may be configured to selectively energize the one or more electromagnets at a specified third energization value to partially inhibit movement of the spring seat sleeve 200 relative to the central suspension spring core, where the specified third energization value is greater than the specified second energization value and less than the specified first energization value.

Figure 4:
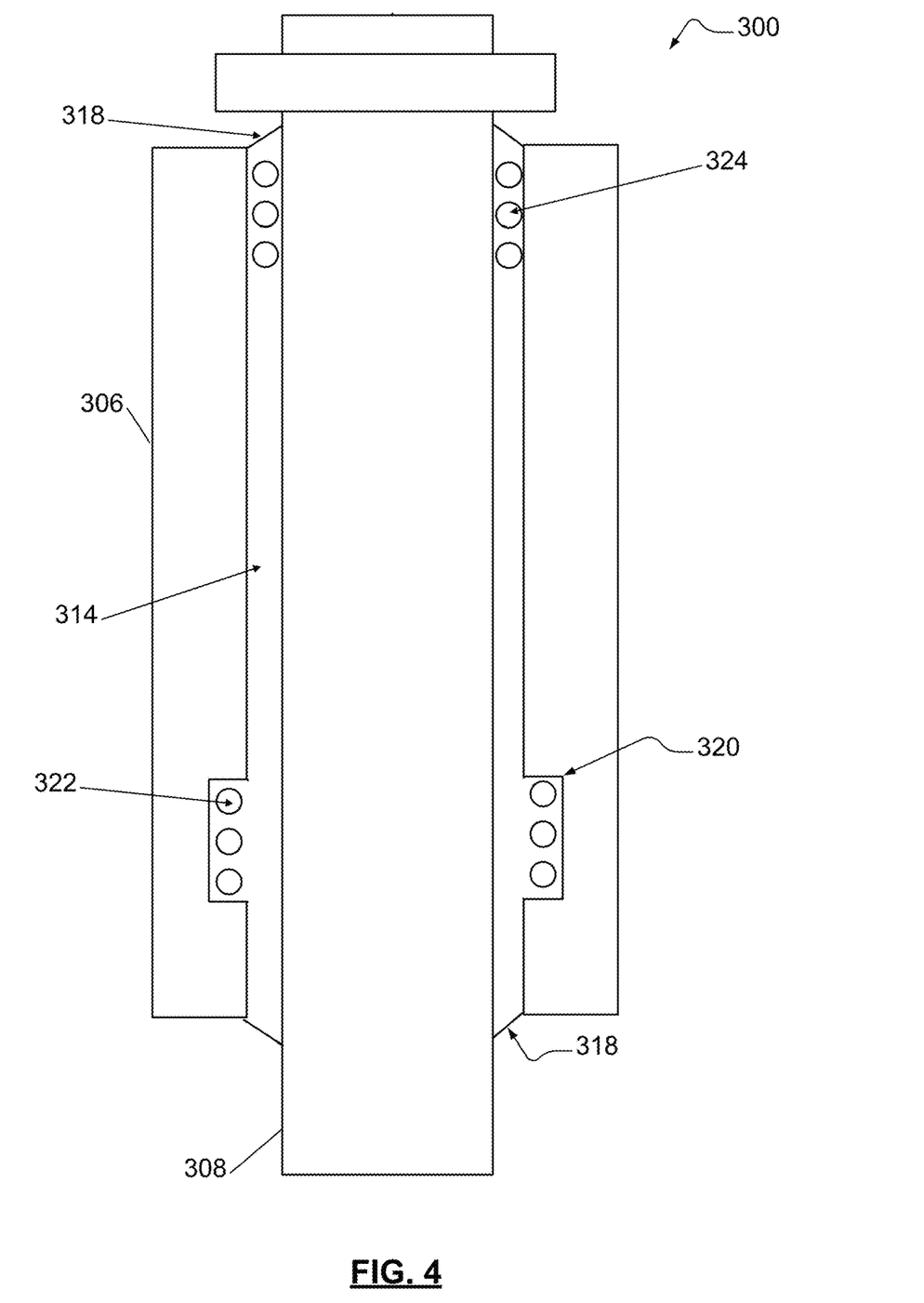
FIG. 4 is a front sectional view of an example embodiment of a spring seat sleeve including seals for retaining a magnetorheological fluid and multiple electromagnets for modifying a viscosity of the magnetorheological fluid.

FIG. 4 is a front sectional view of an example embodiment of a spring seat sleeve 300 including seals 318 for retaining a magnetorheological fluid 314, and multiple electromagnets 322 for modifying a viscosity of the magnetorheological fluid. As shown in FIG. 4, the electromagnets 322 are located in a groove 320 of a sidewall of the outer sleeve 306.

FIG. 4 also illustrates example electromagnets 324 in an upper region of the space for the MR fluid 314, between an outer surface of the central suspension spring core 308 and the inner surface of the outer sleeve 306. In these examples, the electromagnets 322 and 324 may be located within the MR fluid 314, within a space between the outer surface of the central suspension spring core 308 and the inner surface of the outer sleeve 306, within the outer sleeve 306 (such as in a groove 320 of the outer sleeve 306), etc.

Figure 5:
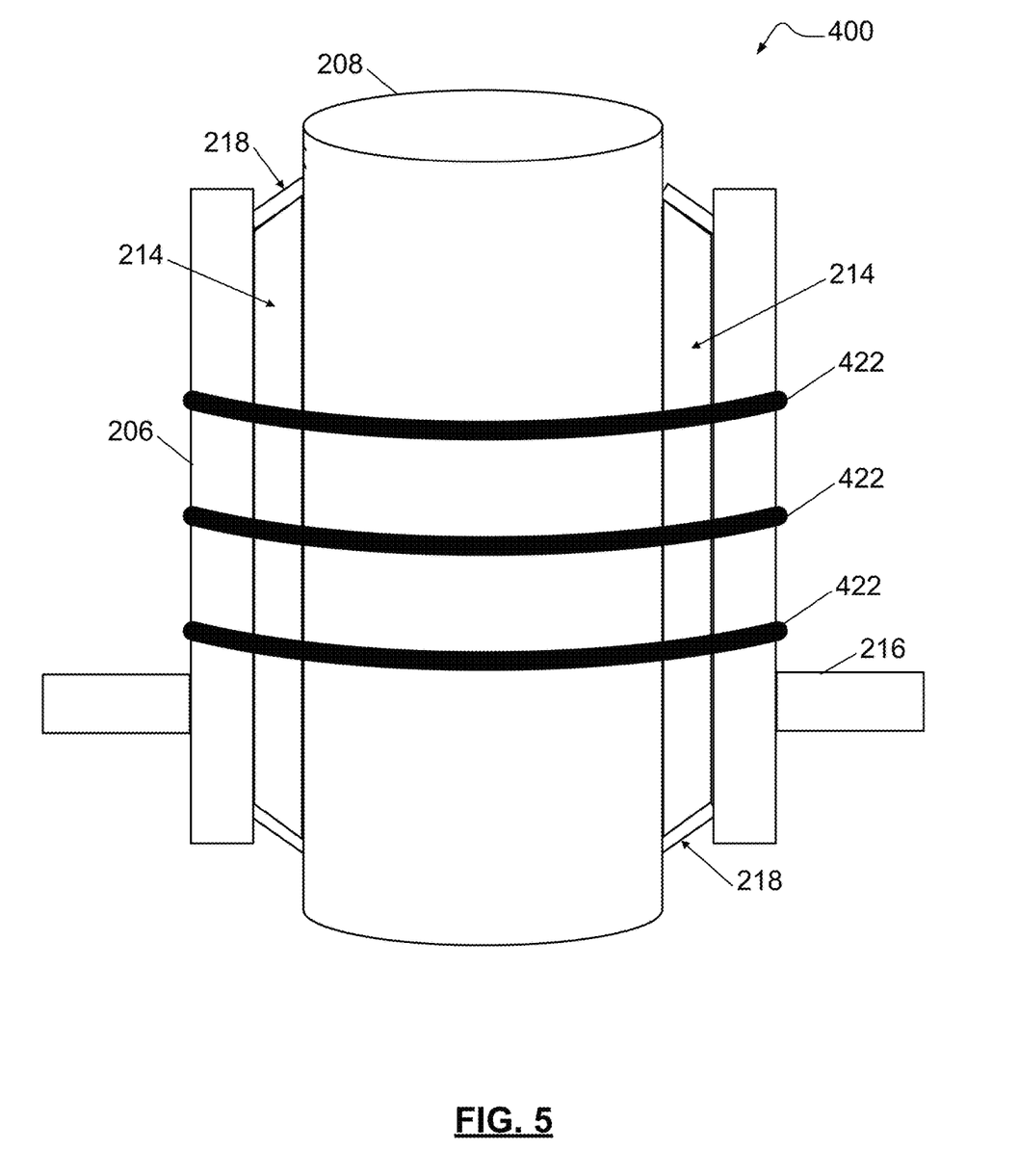
FIG. 5 is front view of the spring seat sleeve of FIG. 3, including multiple coaxial electromagnets.

In other example embodiments, electromagnets may be located in other positions with respect to the MR fluid 314 and the spring seat sleeve 300. For example, FIG. 5 illustrates multiple coaxial electromagnets 422 surrounding the outer sleeve 206 of the spring seat sleeve 400.

The coaxial magnets 422 may surround an outer surface of the outer sleeve 206, may be formed inside the outer sleeve 206, may be located in a space between the outer sleeve 206 and the central suspension spring core 208, etc.

Figure 6:
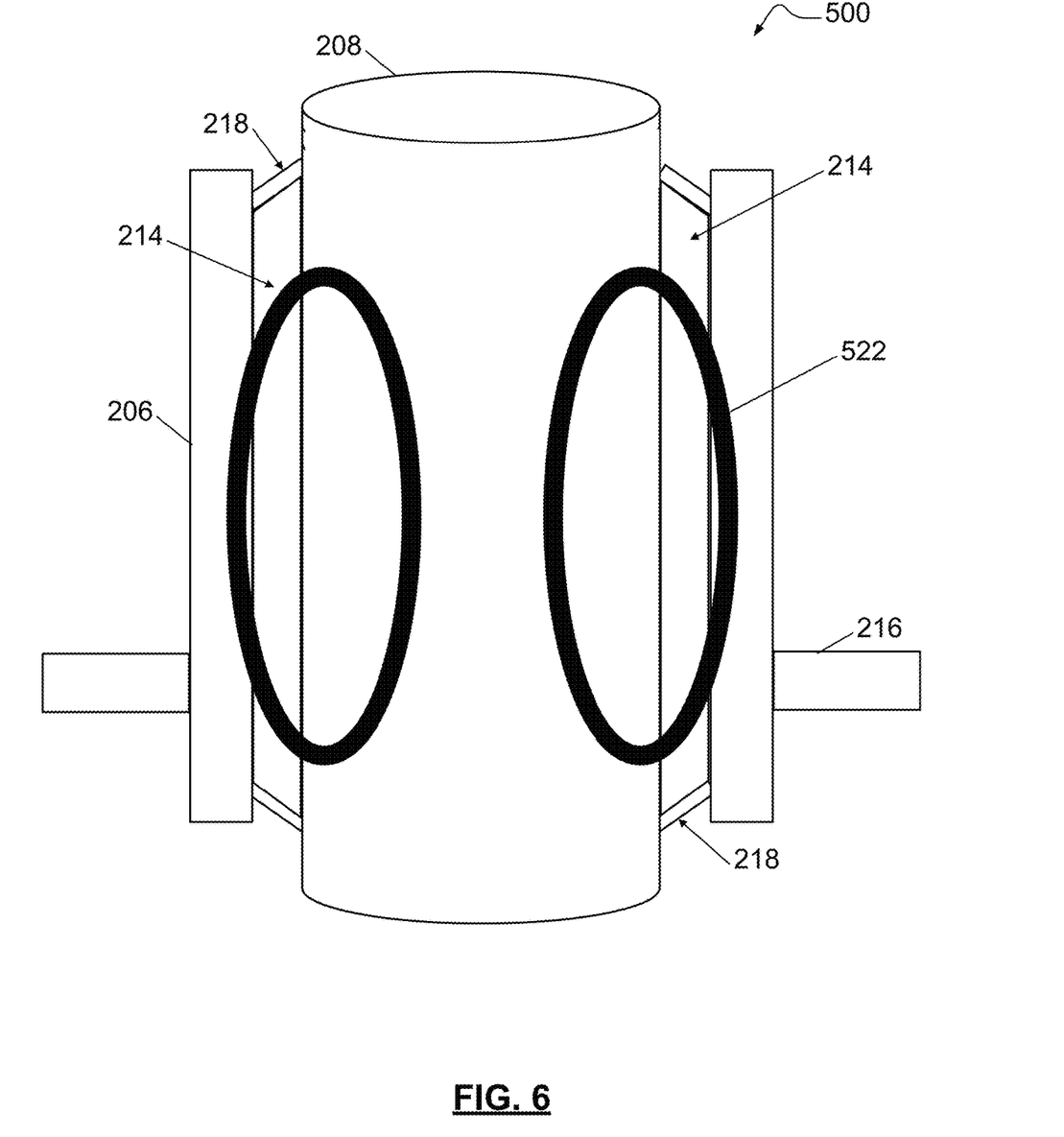
FIG. 6 is front view of the spring seat sleeve of FIG. 3, including multiple field electromagnets.

FIG. 6 is front view of the spring seat sleeve of FIG. 3, including multiple field electromagnets 522. The field electromagnets 522 may extend in a direction parallel to a longitudinal direction of the central suspension spring core 3208 of the spring seat sleeve 500. For example, the field electromagnets may extend vertically along an outer surface of the outer sleeve 206, may be located inside the outer sleeve 206, may extend vertically in a space between the outer sleeve 206 and the central suspension spring core 208, etc.

In other example embodiments, any suitable arrangement of one or more electromagnets may be used. The electromagnets may have any suitable shape, electromagnetic properties, etc., and may be designed to generate an electromagnetic field that corresponds to activation of the MR fluid 214 (e.g., an electromagnetic field that modifies a viscosity of the MR fluid 214). The electromagnets may be energized by any sufficient power source, which may be controlled by the suspension control module 26.

Figure 7:
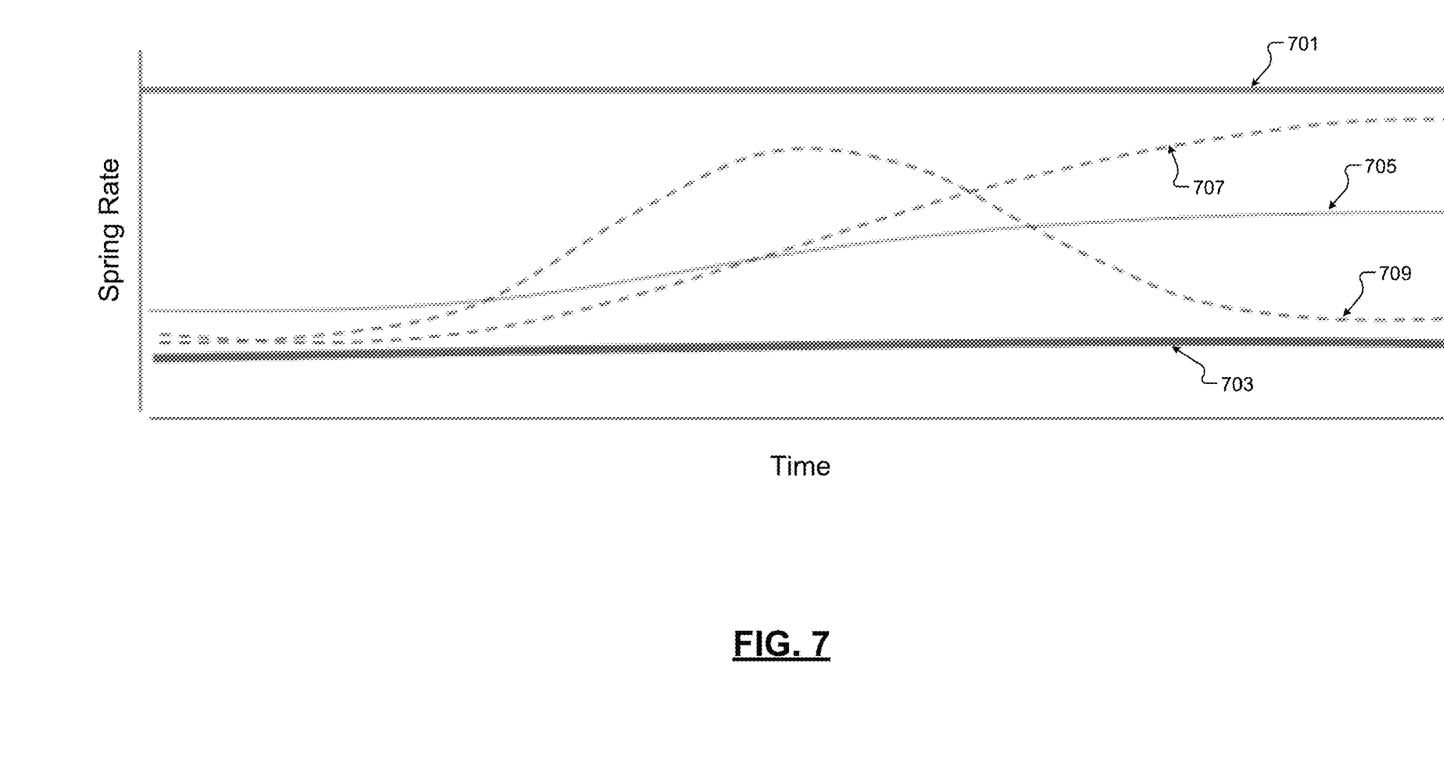
FIG. 7 is graph illustrating example transient spring rate profiles over time.

The suspension control module 26 may be configured to change a level of energy supplied to the one or more electromagnets over a specified period of time, according to a specified transient spring rate restriction profile. FIG. 7 is graph illustrating example transient spring rate profiles over time.

As shown in FIG. 7, a profile 701 may include a high level of energization that is constantly applied to maintain a locked state of the spring seat sleeve. This profile may be used when, e.g., a driver selects a high stiffness setting for a performance driving mode.

The profile 703 includes a low level (or no level) of energization, which may allow the spring seat sleeve to move freely with respect to a central suspension spring core. The profile 703 may correspond to a ride comfort setting selected by the driver, may correspond to a default setting when a vehicle is traveling on a highway, etc.

The profile 705 is an intermediate value, which provides stiffness between the performance setting of the profile 701 and the ride comfort setting of the profile 703. The profile 707 gradually increases stiffness, which may correspond to a driver activating a sport handling mode, etc.

The profile 709 includes a transient increase and decrease over the time period, which may be used to capture a wheel hop condition, etc. For example, the specified transient spring rate restriction profile 709 may include an increasing rate of energization during a first time period, followed by a decreasing rate of energization during a second time period subsequent to the first time period, to capture a displacement of the wheel beyond a threshold displacement value.

In some example embodiments, the vehicle sensors 24 of the vehicle 10 may include a wheel movement sensor, to capture movement of the wheel (e.g., relative to a position of the vehicle body, etc.). If the suspension control module 26 detects a violent motion of the wheel beyond a specified threshold (such as a wheel hop condition due to uneven road terrain), the suspension control module 26 may be configured to grab the wheel with a temporary stiffer spring rate setting, then release the wheel by reducing the spring rate setting to return to a ride comfort level.

In some example embodiments, the vehicle sensors 24 may include a camera, a lidar sensor, etc., that can detect upcoming hazards in the road in front of the vehicle. the suspension control module 26 may be configured to modify a viscosity of the MR fluid in advance of the vehicle contacting the detected road hazard (such as by loosening or stiffening the spring rate via the MR fluid), in order to reduce an impact of the road hazard on the suspension and feeling of the driver in the vehicle.

As described above, the MR fluid may provide a range of damping from none, to very large (e.g., hard to move the spring seat sleeve). Depending on a current through an electromagnetic coil associated with the MR fluid, the spring rate characteristic may have a velocity dependency. This may be useful in improving ride frequencies by reducing rates in areas of interest (e.g., 1-3 Hz), while increasing rates near a wheel hop frequency (e.g., 12-14 Hz).

MR fluid may change from high to low damping (and vice-versa) very quickly, such as less than or equal to twenty milliseconds. The MR fluid may be used to reduce a spring rate and improve a ride over rough road or obstacles, in response to a signal that a wheel impact is ahead. The spring rate may also be varied over suspension corner displacement, or in reaction to a load increase, to maintain a constant corner frequency.

Figure 8:
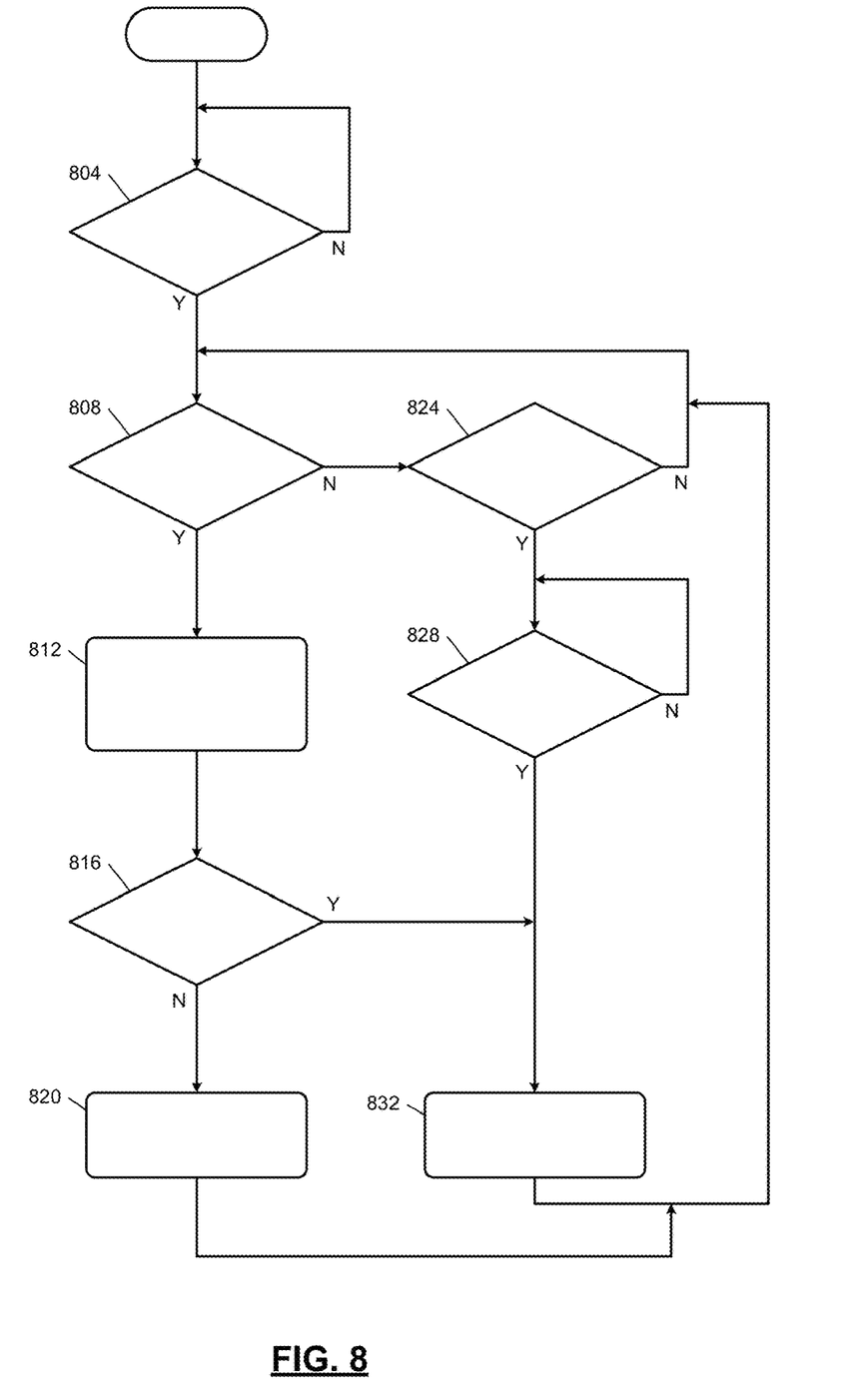
FIG. 8 is a flowchart depicting an example method of controlling a spring rate of a multi-rate suspension using magnetorheological fluid.

FIG. 8 is a flowchart depicting an example method of controlling a spring rate of a multi-rate suspension using magnetorheological fluid. The method may be executed by, for example, the suspension control module 26 of FIG. 1. At 804, the method begins by determining whether a suspension multi-rate spring setting has been activated (e.g., by receiving a driver input via an input interface of the vehicle). If not, control waits until the setting is activated.

Once the suspension multi-rate spring setting has been activated at 804, the suspension control module 26 is configured to determine whether a firm suspension setting has been specified by the driver, at 808. If so, control proceeds to 812 to monitor for suspension movement and/or vehicle movement at 812 (e.g., via one or more vehicle sensors 24).

At 816, the suspension control module 26 is configured to determine whether movement of the vehicle and/or suspension is less than a specified threshold. If not, control activates the MR fluid using a slow transition setting at 820 (e.g., to allow the suspension time to deal with current vibrations/movement). If the suspension control module 26 determines that movement of the vehicle and/or suspension is less than the threshold value, control proceeds to activate the MR fluid using a fast transition setting at 832.

Returning to 808, if the suspension control module 26 determines that a driver firm suspension setting is not activated, control proceeds to 824 to determine whether a transient wheel motion is detected, such as a wheel hop beyond a specified wheel displacement threshold. If so, control proceeds to 828 to determine whether the wheel is in a correct position for a transition (e.g., using one or more vehicle sensors 24).

If the suspension control module 26 determines at 828 that the wheel is in a correct position for a transition at 828, control proceeds to 832 to activate the MR fluid using a fast transition setting. For example, control may monitor a position of the wheel to stiffen the spring rate at an appropriate position to capture a wheel hop event.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle suspension control system comprising:
   a central suspension spring core;
   a first suspension spring surrounding an upper portion of the central suspension spring core;
   a second suspension spring surrounding a lower portion of the central suspension spring core, the first suspension spring and the second suspension spring coupled between a wheel and a fixed structure of a vehicle to inhibit movement of the wheel;
   a spring seat surrounding the central suspension spring core and coupled between the first suspension spring and the second suspension spring, the spring seat including an outer sleeve and multiple seals for retaining magnetorheological fluid between the outer sleeve and the central suspension spring core;
   one or more electromagnets adjacent the spring seat; and
   a suspension control module configured to energize the one or more electromagnets to selectively modify a viscosity of the magnetorheological fluid to inhibit movement of at least one of the first suspension spring and the second suspension spring,
   wherein the suspension control module is configured to selectively energize the one or more electromagnets at a specified first energization value where the viscosity of the magnetorheological fluid is sufficient to generate friction between the central suspension spring core and the outer sleeve of the spring seat to lock the outer sleeve of the spring seat in place along the central suspension spring core via friction.

2. The vehicle suspension control system of claim 1, wherein the suspension control module is configured to reduce energization of the one or more electromagnets to selectively allow movement of both the first suspension spring and the second suspension spring.

3. The vehicle suspension control system of claim 1, wherein the suspension control module is configured to selectively energize the one or more electromagnets to transition between:
   a first state in which the one or more electromagnets are energized at the specified first energization value to lock the spring seat to the central suspension spring core and inhibit movement of the second suspension spring; and
   a second state in which the one or more electromagnets are energized at a specified second energization value to allow the spring seat to move relative to the central suspension spring core and allow movement of the second suspension spring, wherein the specified second energization value is less than the specified first energization value.

4. The vehicle suspension control system of claim 3, wherein the specified second energization value is zero.

5. The vehicle suspension control system of claim 3, wherein the suspension control module is configured to transition from the second state to the first state to facilitate the magnetorheological fluid locking the spring seat to the central suspension spring core in less than or equal to twenty milliseconds.

6. The vehicle suspension control system of claim 3, wherein,
   the suspension control module is configured to selectively energize the one or more electromagnets at a specified third energization value to partially inhibit movement of the spring seat relative to the central suspension spring core, and the specified third energization value is greater than the specified second energization value and less than the specified first energization value.

7. The vehicle suspension control system of claim 1, wherein the one or more electromagnets include at least one coaxial magnet configured to extend in a circumference around the central suspension spring core.

8. The vehicle suspension control system of claim 1, wherein the one or more electromagnets include at least one field magnet configured to extend parallel to a longitudinal direction of the central suspension spring core.

9. The vehicle suspension control system of claim 1, wherein the suspension control module is configured to change a level of energy supplied to the one or more electromagnets over a specified period of time, according to a specified transient spring rate restriction profile.

10. The vehicle suspension control system of claim 9, wherein the specified transient spring rate restriction profile includes an increasing rate of energization during a first time period, followed by a decreasing rate of energization during a second time period subsequent to the first time period, to capture a displacement of the wheel beyond a threshold displacement value.

11. The vehicle suspension control system of claim 1, wherein the first suspension spring and the second suspension spring are coupled in series between the wheel and the fixed structure of the vehicle.

12. The vehicle suspension control system of claim 1, wherein the fixed structure includes a chassis of the vehicle.

13. The vehicle suspension control system of claim 1, further comprising at least one vehicle sensor configured to detect terrain data in front of the vehicle, wherein the suspension control module is configured to adjust a level of energization applied to the one or more electromagnets according to the terrain data detected by the at least one vehicle sensor.

14. The vehicle suspension control system of claim 1, wherein the suspension control module is configured to adjust a level of energization applied to the one or more electromagnets according to a driving stiffness setting input received via a user interface.

15. A method of controlling a vehicle suspension, the method comprising:

energizing, via a suspension control module, one or more electromagnets adjacent a spring seat surrounding a central suspension spring core, the spring seat coupled between a first suspension spring and a second suspension spring each surrounding the central suspension spring core, the spring seat including an outer sleeve and multiple seals for retaining magnetorheological fluid between the outer sleeve and the central suspension spring core, wherein energizing the one or more electromagnets modifies a viscosity of the magnetorheological fluid to inhibit movement of at least one of the first suspension spring and the second suspension spring; and reducing energization, by the suspension control module, of the one or more electromagnets to selectively allow movement of both the first suspension spring and the second suspension spring, wherein the suspension control module is configured to selectively energize the one or more electromagnets at a specified first energization value where the viscosity of the magnetorheological fluid is sufficient to generate friction between the central suspension spring core and the outer sleeve of the spring seat to lock the outer sleeve of the spring seat in place along the central suspension spring core via friction.

16. The method of claim 15, further comprising:

selectively energizing the one or more electromagnets at the specified first energization value to lock the spring seat to the central suspension spring core and inhibit movement of the second suspension spring; and selectively energizing the one or more electromagnets at a specified second energization value to allow the spring seat to move relative to the central suspension spring core and allow movement of the second suspension spring, wherein the specified second energization value is less than the specified first energization value.

17. The method of claim 16, further comprising selectively energizing the one or more electromagnets at a specified third energization value to partially inhibit movement of the spring seat relative to the central suspension spring core, wherein the specified third energization value is greater than the specified second energization value and less than the specified first energization value.

18. The method of claim 15, wherein further comprising changing a level of energy supplied to the one or more electromagnets over a specified period of time, according to a specified transient spring rate restriction profile.

19. The method of claim 18, wherein the specified transient spring rate restriction profile includes an increasing rate of energization during a first time period, followed by a decreasing rate of energization during a second time period subsequent to the first time period, to capture a displacement of a wheel beyond a threshold displacement value.

* * * * *